United States Patent [19]

Lustgraaf

[11] 4,040,313
[45] Aug. 9, 1977

[54] PRECISION CIRCULAR SAW BLADE GRINDING MACHINE

[76] Inventor: William John Lustgraaf, 124 Glacier Drive, Lolo, Mont. 59847

[21] Appl. No.: 644,566

[22] Filed: Dec. 29, 1975

[51] Int. Cl.² ............................................ B23D 63/12
[52] U.S. Cl. ......................................... 76/37; 76/42; 51/100 P; 51/216 H
[58] Field of Search .............. 51/34 A, 100 R, 100 D, 51/216 ND, 216 H; 74/575, 813 R; 76/37, 40, 42

[56] References Cited

U.S. PATENT DOCUMENTS

| | | | |
|---|---|---|---|
| 2,129,031 | 9/1938 | Ross | 51/216 H X |
| 2,477,135 | 7/1949 | Marker, Jr. et al. | 51/100 R |
| 2,517,873 | 8/1950 | Harrell | 76/40 |
| 2,610,452 | 9/1952 | Hill | 51/100 P X |
| 3,109,327 | 11/1963 | McConnell | 76/40 |
| 3,149,591 | 9/1964 | Aiki et al. | 74/575 X |
| 3,952,616 | 4/1976 | Varley | 51/216 ND X |

FOREIGN PATENT DOCUMENTS 627,827  10/1927  France .................................... 76/40

Primary Examiner—Al Lawrence Smith
Assistant Examiner—James G. Smith
Attorney, Agent, or Firm—Wells, St. John & Roberts

[57] ABSTRACT

A grinding machine for sharpening circular saw blade teeth. The machine includes an arbor for supporting a circular saw blade at a pre-selected position relative to a grinding disc. The grinding disc is mounted to a parallelogram linkage that has a tracing pin fixed thereto. Movement of the tracing pin over the surface of a sawtooth-shaped template causes corresponding movement of the grinding disc against a selected sawtooth. Also included is a tooth indexing mechanism whereby precise spacing of the circular saw teeth is obtained. This is accomplished by a tooth spacing pattern mounted to the arbor and by an indexing pawl that facilitates rotation of the arbor in precise increments equal to desired spacing for the teeth of the blade being operated on. The arbor is pivotably mounted relative to the grinding disc to enable bevel grinding of the tooth surfaces.

21 Claims, 7 Drawing Figures

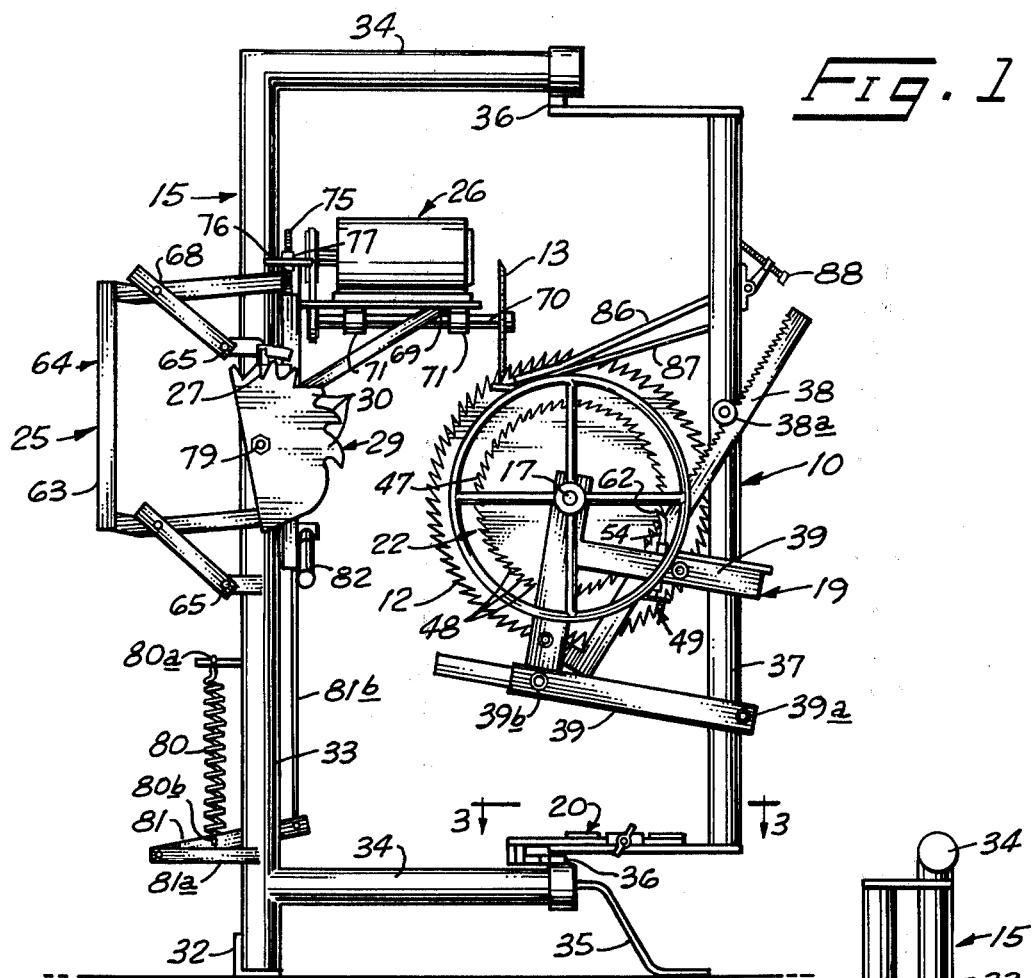
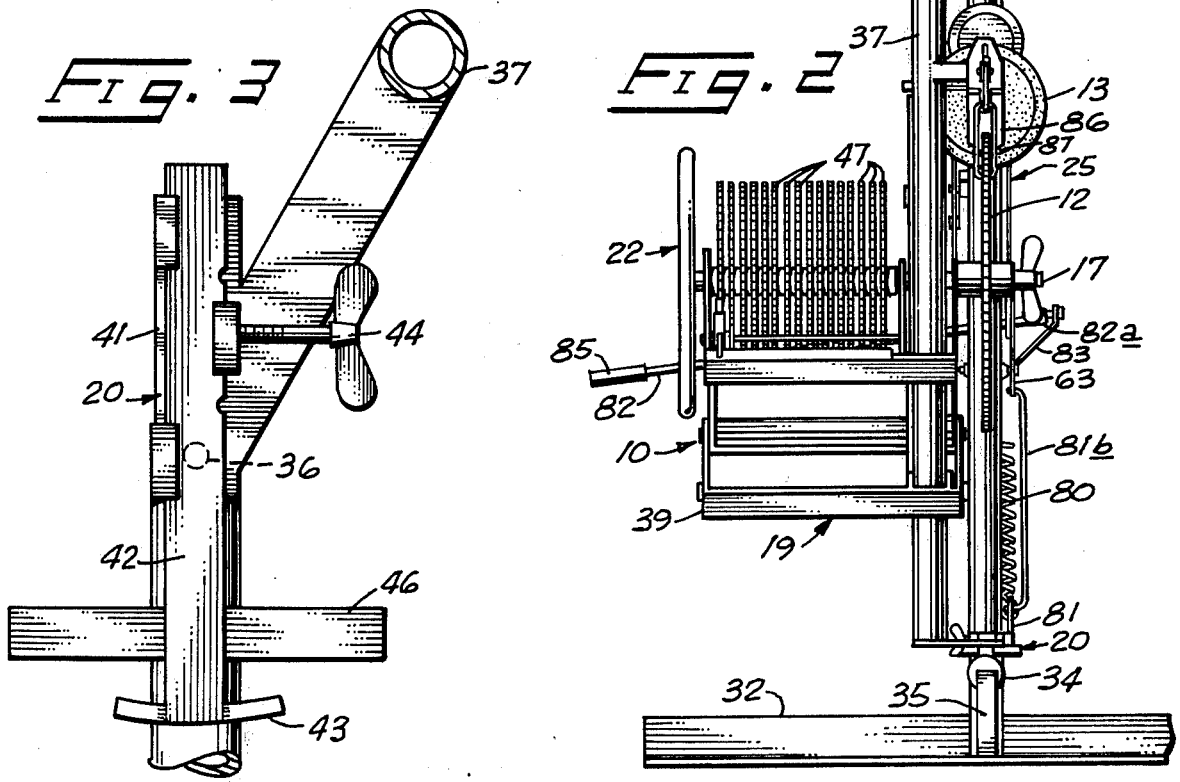

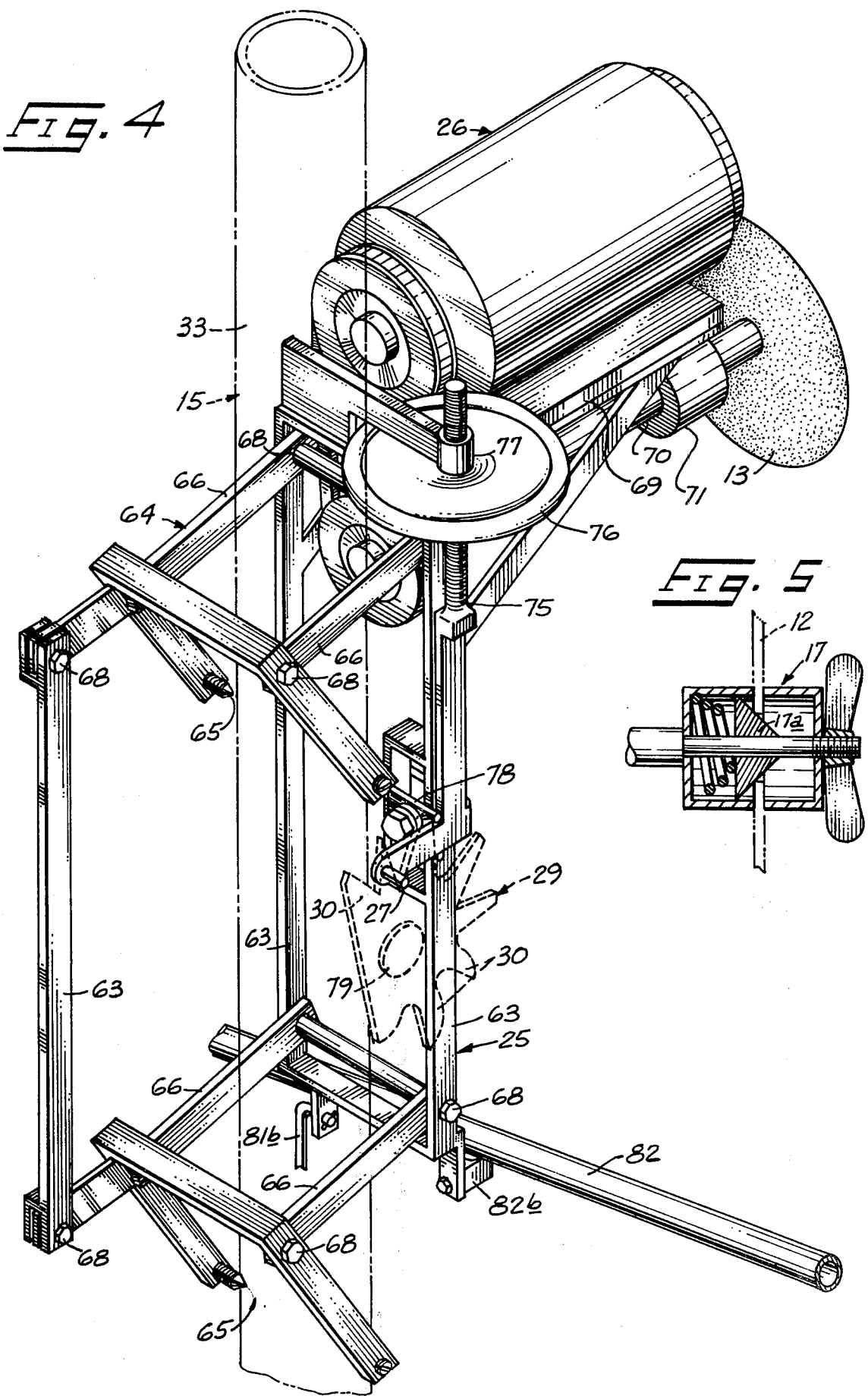

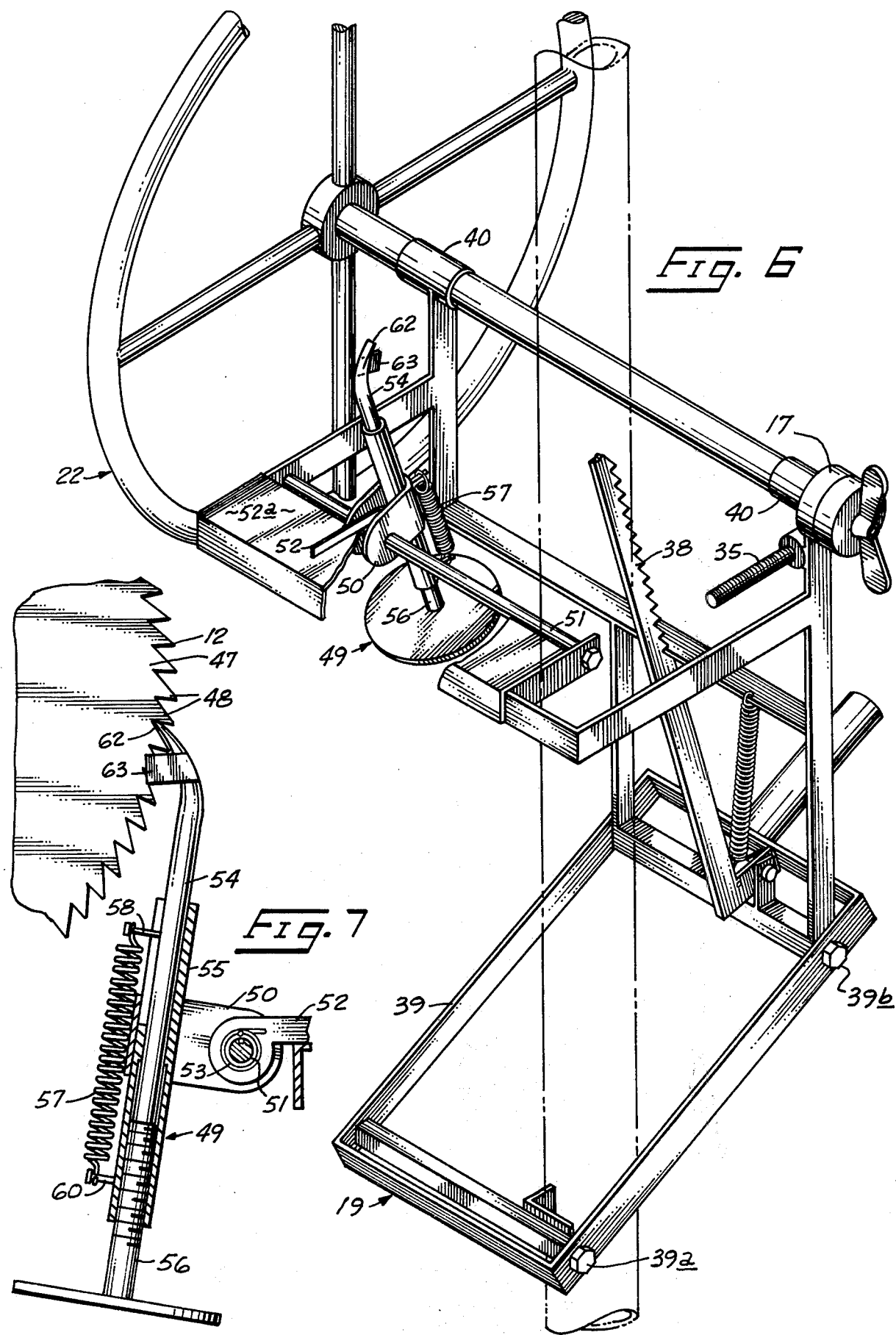

PRECISION CIRCULAR SAW BLADE GRINDING MACHINE

BACKGROUND OF THE INVENTION

This invention relates to saw blade sharpening machines, and particularly to such machines utilized to sharpen circular saw blades.

Imperfections, such as blade eccentricity, variable tooth spacing, and variable tooth shape and size are common both in new blades and used blades that have been ground on inadequate machinery or filed by hand. The cost of accurate, semi-automatic sharpening machines for circular saw blades is ordinarily prohibitive to that portion of the market that makes use of circular saw blades. Therefore, when it is desired to resharpen such a blade, the owner must take it to a specialized shop where the blade is sharpened by a complex and extremely expensive piece of machinery. The other recourse for the user is to sharpen the saw blade by hand. This procedure is almost always detrimental to the cutting efficiency of the saw blade since it is nearly impossible for a blade to be precisely sharpened utilizing only hand tools. In fact, continued hand sharpening causes blade eccentricity which, in turn, can eventually cause bearing damage and excessive wear on the arbor of the saw on which the blade is mounted.

Continuous filing of circular saw blades causes the tooth periphery to become out of round. A process called "jointing" is utilized to return the blade periphery to a balanced circular configuration. This process produces "flats" or "brights" on each tooth point on the saw. These "flats" are produced by mounting the saw blade on an arbor and holding an abrasive surface against the saw blade as it is rotated. The surface is held rigidly against movement with the out-of-round saw blade. The result is that the "flats" are formed, replacing the points of all or nearly all the teeth on the saw blade. For filing purposes these "flats" are utilized to determine depth of cut necessary to bring the saw blade back to its true circular shape. The present device eliminated the necessity of jointing a saw blade separately from the grinding operation by precisely locating the depth and spacing of each tooth during the grinding operation.

Another step in the process of sharpening circular saws is called "gumming." "Gumming" may be defined as the deepening of the gullets between adjacent teeth for more efficient removal of sawdust from the kerf. Deep gullets also facilitate filing by spacing adjacent teeth apart a distance sufficient to allow clearance of a file or grinding disc. Often gullets are formed at an angle that is critical to the operation of the saw blade. The gullet is tangential to the "face" of one tooth and the "tooth back" of an adjacent tooth. The front face of the tooth forms a positive or negative "rake" angle. In some grinding operations, the gullet and rake angle are ground simultaneously since the grinding disc is pre-dressed to the desired configuration, and the saw blade is held at a prescribed angle relative to the plane of the grinding disc.

It is also often required to produce one or more beveled surfaces along circular saw blade teeth. A bevel is any tooth surface that is angularly offset from a surface that is normally perpendicular to the planar sides of a saw blade. Often, bevels on successive teeth are set at equal but opposite angles to the plane of the blade sides. Ordinarily, the planar surfaces of the saw blades are held perpendicular to the grinding surface. Grinding bevels is accomplished by holding the saw blade with its planar sides at a prescribed angle relative to the surface of a grinding disc. In most grinding machines, bevels are formed by angulating the blade surface and subsequently grinding all the prescribed bevels for a particular angle, then the blade is shifted to another angle so the remaining opposite bevels may be ground.

Circular saw blades come in many different sizes, utilizing many different numbers of teeth, and differing teeth configurations. Rip saws generally have all teeth of the same configuration. Cross-cut saws may also have all teeth identical. However, almost all combination type saws that are utilized both for cross-cut and ripping purposes have sets of teeth spaced about the saw periphery and separated by deep gullets. Each set of teeth includes a plurality of shortened "spurs" with a large "raker" tooth at the forward edge of the group. Sharpening of a combination blade is ordinarily more difficult than sharpening of a standard rip saw blade or a cross-cut blade that has all teeth identical. The "spurs" and "rakers" must be filed or ground separately since the angles are seldom the same for both the raker and spur teeth.

It has also been found that automatic grinding machines are insensitive to grinding pressures that may result in excessive blade heat during the sharpening process. Excessive heat removes blade "tension" and will often cause a blade to wobble when rotating at relatively high RPM on a saw arbor. A manually controllable device allows for "light-touch" grinding with several passes possibly being made over an area in order to bring it to the proper condition without causing excessive blade heat.

It is desirable to provide some form of apparatus whereby circular saw blades may be precisely sharpened and reshaped or "trued" without requiring purchase of an extremely expensive and complex piece of machinery. It is also desirable to offer such a machine that is simple in design and relatively easy to operate.

U.S. Pat. No. 3,457,809 to Martin Bowerman discloses a saw blade grinder for sharpening teeth of all types of circular saws. The arbor and mounting base for this machine are movable from a position where the blade may be sharpened, to another position where the individual blade teeth may be "set." The grinding wheel of this device must be dressed to the configuration of the particular teeth to be sharpened. In addition, the teeth of the saw blade are used as a spacing index to present each successive tooth to the grinding operation. If the gullet depth is correct and the blade has been jointed, it is possible to obtain a serviceable and relatively efficiently sharpened blade from this device.

U.S. Pat. No. 545,064, granted to Fleck, describes a saw sharpening machine that utilizes a fixed arbor for a saw blade and a relatively movable grinding disc to effect the grinding of the blade. The machine provides an indexing mechanism to bring successive teeth into proper alignment with the grinding disc. This mechanism is operated by direct operation of the sharpening machine. The indexing operation, however, does not rely upon a sawtooth indexing pattern and pawl arrangement as is disclosed in the present application.

U.S. Pat. No. 535,496 to Hall discloses a relatively complex saw sharpening machine. Like the Fleck device, the Hall sharpening machine utilizes a tooth shape forming template or block that is utilized to control movement of the grinding wheel over the tooth configuration to produce a proper tooth shape. However, both devices depend on planar reciprocating motion of the grinding wheel to define the tooth faces. Further, neither Hall nor Fleck disclose an indexing mechanism that is easily adapted to all different sizes and numbers of blade teeth.

U.S. Pat. No. 1,551,230 discloses a hand-operated circular saw sharpened and gumming apparatus. Basically, it comprises a mounting device for a saw rather than a complete sharpening apparatus. The device mounts the saw on a vertically and horizontally movable carriage. The carriage is also mounted for rotation about a vertical axis to facilitate angular positioning of the saw blade for producing beveled surfaces. No device is disclosed for properly indexing the saw blade in precise increments about the axis of the arbor to establish the correct tooth spacing. Further, no device is illustrated or described for producing the proper tooth configuration moving the grinding disc in response to movement of a tracing pin along a tooth-shaped template.

U.S. Pat. No. 2,175,514 to Buchanan discloses a complex saw grinding machine that is utilized for grinding and sharpening of tubular saws with differing numbers of teeth and varying tube diameters. The arbor utilized to hold the tubular saws is indexed in increments corresponding to the number of sawteeth by operation of a selected ratchet wheel and pawl. The depth of the cut is determined by a cam arrangement and the tooth configuration is determined by the particular configuration of the grinding disc. The disc is automatically moved in a vertically plane to engage and sharpen each tooth at the end of a tube. As the grinding disc is raised away from engagement with the tube, the ratchet mechanism is operated to rotate the tube about a vertical axis, moving the next adjacent tooth into alignment with the grinding disc.

Of the above Patents, none describes the combination of (a) a tooth indexing mechanism whereby the sawteeth are accurately moved in prescribed angular increments about the axis of an arbor to locate the teeth in proper alignment with the grinding disc, and (b) a sawtooth template and race pin whereby the proper configuration of an individual tooth may be formed by moving the trace pin over the sawtooth configuraion to impart identical movement of the grinding disc over the blade to be sharpened. The selected sawtooth template includes the back side, gullet, and face configuration desirable for the particular style of blade to be sharpened. In addition, few of the above described machines allow for the sharpening of a circular saw blade while jointing and gumming the blade in the same process.

SUMMARY OF THE INVENTION

A circular saw blade sharpening apparatus is described herein. It includes an upright framework that mounts a circular saw blade receiving arbor and a driven grinding disc. A disc mounting means is provided for holding the disc in a prescribed angular orientation and for mounting the disc to the supportive framework for movement (while in the prescribed angular orientation) to operatively engage a saw blade mounted on the arbor. A sawtooth-shaped template is provided on the supportive framework that includes a tooth configuration thereon corresponding to the configuration of tooth of the saw blade to be sharpened. A trace pin is located on the disc mounting means and is operatively engageable with the sawtooth-shaped template. Movement of the trace pin over the template will cause corresponding movement of the grinding disc along the surfaces of the tooth being sharpened. Also included is a saw blade indexing means operatively associated with the arbor. The indexing means enables selective rotation of a saw blade on the arbor about the axis in prescribed angular increments equal to the spacing between adjacent teeth of the saw blade.

It is a first object of the present invention to provide a saw sharpening apparatus that is simple in construction and yet will function to efficiently and accurately sharpen circular saw blades while simultaneously performing gumming and jointing operations.

Another object is to provide such a machine that will perform sharpening operations on circular saw blades of varying diameters and teeth numbers and configurations.

A further object is to provide such an apparatus that will perform saw sharpening functions upon saw blades having differing blade configurations, such as combination circular saw blades, as well as upon saw blades having uniform teeth configurations.

A still further object of my invention is to provide a circular saw sharpening apparatus that may be set up to produce a combination of angles over a tooth surface in a "once around" grinding operation.

These and still further objects will become apparent in reading the following description which, taken with the accompanying drawings, discloses a preferred form of the present invention. It is to be understood, however, that the accompanying drawings and following description are given only by way of example to describe a single preferred form of my invention. It is understood that various other forms may be produced that are not specifically disclosed herein that do not depart from the scope of the present invention. It is therefore intended that only the claims located at the end of this application are to be taken as definitions and as placing restrictions upon the scope of my invention.

BRIEF DESCRIPTION OF THE DRAWINGS

FIG. 1 is an elevational side view of the present circular saw blade sharpening apparatus;

FIG. 2 is a frontal view of the apparatus as seen from the right in FIG. 1;

FIG. 3 is an enlarged fragmentary section view taken along line 3—3 in FIG. 1;

FIG. 4 is a fragmentary enlarged pictorial view of a portion of the present apparatus with segments thereof shown in phantom and dashed lines;

FIG. 5 is a section view taken along line 5—5 in FIG. 6;

FIG. 6 is another enlarged pictorial view of a segment of the present apparatus showing portions thereof broken away and other portions in phantom line; and FIG. 7 is an enlarged fragmentary section view taken substantially along line 7—7 in FIG. 5.

DETAILED DESCRIPTION OF A PREFERRED EMBODIMENT

The saw sharpening apparatus embodying a preferred form of my invention is illustrated in the accompanying drawings and is designated therein by the reference character 10. The apparatus 10 is utilized for sharpening circular saw blades as that shown at 12 in FIG. 1 and 2. The apparatus utilizes a circular grinding disc 13 for performing the sharpening operation.

Saw blades 10 is mounted to the present device by an arbor 17 as shown in FIGS. 2, 5 and 6. The arbor includes a cone shaped centering member 17a. Member 17a is operable to receive and precisely center circular saw blades relative to the rotational axis of arbor 17. The conical shape of member 17a adapts the present machine to receive and precisely mount saw blades having differing diameter arbor holes.

Apparatus 10 includes a supportive framework 15. The blade mounting arbor 17 is mounted to the framework by an arbor carriage 19. The arbor carriage 19 is mounted on framework 15 for pivotal movement about an upright axis so the saw blade to be sharpened may be positioned at selected angles relative to the grinding disc 13. A stop means 20 is provided to stop pivotal angular movement of the arbor carriage at selected angular positions. An indexing means 22 is supported on the arbor 17 by carriage 19. Indexing means 22 is utilized to properly space the individual saw teeth angularly about the arbor axis during the sharpening procedure.

Grinding disc 13 is driven by means of an electric motor 26 to rotate about a horizontal axis. A mounting means 25 connects the disc 13 and drive means 26 to framework 15 such that the disc is maintained within a vertical rotational plane but remains freely movable. A trace pin 27 is provided on the mounting means 25 (FIGS. 1 and 4). Trace pin 27 operatively cooperates with a tooth shape template 29 that is mounted to framework 15. The template includes separate tooth shapes 30 formed thereon that are exact duplicates of known standard forms of saw teeth. Movement of the trace pin 27 over a selected tooth configuration on template 29 will result in duplicate corresponding movement of the grinding disc 13. Thus, if saw blade 12 is properly positioned on arbor 17, movement of the trace pin 27 over a selected tooth shape will result in movement of the grinding disc 13 to reshape the saw tooth engaged therewith to the precise configuration of the selected template tooth 30.

The framework 15 includes a horizontal base 32 with an upright main frame member 33 fixed thereto. Horizontal beams 34 extend in parallel relation from upper and lower locations on the upright member 33. A lower beam member 34 includes a leg section 35 that is utilized for support along with base portion 32. Arbor carriage 19 is mounted between the free ends of horizontal beams 34. In includes an upright 37 mounted at pivots 36 to the beam ends. Pivots 36 are aligned vertically so the pivot axis will perpendicularly intersect the rotational axis of grinding disc 13 and the center point of a saw blade 12 presently mounted on arbor 17.

Arbor 17 is carried on carriage 19 by a lift frame 39 within arbor journals 40 (FIG. 6) thereon. The lift frame 39 is pivoted at 39a and 39b to enable adjustment of the distance between the rotational axis for arbor 17 and the grinding disc 13 to facilitate operation upon differing size saw blades 12. A locking mechanism comprised of an elongated notched bar 38 releasably received between upright 37 and a lock nut 38a (FIG. 1) is provided to selectively locate the arbor axis elevationally. Lateral location of the arbor axis (with respect to the rotational axis of disc 13) is determined by an adjusting bolt 35 (FIG. 6) that is threadably connected to the lift frame. The free end of bolt 35 operates against the upright 37. The bolt will work against the upright 37 to pivot the arbor laterally toward or away from upright 33.

Stop means 20 is illustrated in substantial detail by FIG. 3. Stop means 20 includes a horizontal guide member 41 fixed to a portion of the pivoted carriage 19. This guide 41 slidably receives an elongated bar 42. An inside end of bar 42 has an arcuate cross member 43 fixed thereto. Opposite ends of cross member 43 operatively engage a stop bar 46 that is fixed to the lower horizontal beam 34. A set screw 44 communicates with spaced indentations formed in bar 42 to selectively space the cross member 43 from stop bar 46. This spacing adjusts the amount of angular movement that is required before either end of cross member 43 will come into contact with stop bar 46.

The stop means 20 is constructed so as to restrict pivotal movement of the arbor carriage (and the saw blade held thereon) between extreme angular positions that are equal and opposite to one another relative to the rotational axis of the grinding disc 13. The angular positions correspond to conventional bevel angles commonly utilized with circular saw blades. Thus, a bevel angle may be cut on one side of a saw blade while the carriage is held in one angular position, and an equal but opposite bevel angle may be cut in the same or another tooth while the carriage is located at the opposite angular position.

The indexing means 22 is mounted to the arbor carriage 19 to enable precise incremental angular movements of the saw blade about the arbor axis. The indexing means 22 is comprised of a plurality of circular saw blade teeth spacing patterns 47 arranged along the length of arbor 17. Patterns 47 operate against a pawl means 49 (FIGS. 1, 6 and 7) Each pattern 47 includes a number of precisely positioned teeth 48 between which the tip of pawl means 49 is received. The patterns 47 are fixed to the arbor shaft for turning within the arbor journals 40 in response to turning movement of the arbor.

It may be noted in FIG. 6 that patterns 47 are not illustrated. The patterns have been omitted in this view for purposes of illustrating the arbor 17 and the arbor carriage 19 with its several pivotal connections and adjustments. When in place, the patterns will appear as shown in FIGS. 1 and 2.

Pawl means 49 is illustrated in substantial detail by FIGS. 6 and 7. Means 49 includes a slide bracket 50 that is mounted to a horizontal slide bar 51 on arbor carriage 19. Bar 51 is located forwardly adjacent to the patterns 47. A position indicator 52 is also slidably mounted to the slide bar 51 and is connected therewith by a torsion spring 53. Spring 53 is utilized to hold the indicator 52 against a reference plate 52a provided on the arbor carriage and to urge the pawl means 49 toward engagement with a selected pattern 47.

A pawl shaft 54 is slidably carried within a guide tube 55 that is fixed to slide bracket 50. The pawl shaft 54 is adjustably movable within the guide tube 55 through operation of an adjustment screw 56. Screw 56 is threadably engaged within the guide tube 55 to operate against the end of pawl shaft 54. Shaft 54 is maintained within guide tube 55 and in engagement with adjustment screw 56 by a spring 57 connected between the shaft 54 and tube 55. Spring 57 is mounted between a post 58 on shaft 54 and at an opposite end, a post 60 on guide tube 55. Pawl shaft 54 includes a pattern engaging point 62 and a side alignment plate 63 at an upper post end. The point 62 is bent toward the tooth spacing patterns 47 to engage between adjacent pattern teeth 48.

The pattern teeth 48 are shaped similar to saw teeth. They should not be confused however with the tooth shape template 29. The teeth 48 are utilized only for the purpose of accurately spacing the teeth of a saw blade about the saw blade axis.

Rotation of the arbor 17 in a counterclockwise direction as seen in FIG. 7 will result in corresponding outward movement of the pawl point 62 as the adjacent tooth 48 cams against pawl point 62. The pawl shaft will pivot about the slide bracket 50 until the point of the tooth moves past the pawl point. When this happens, the pawl will snap into engagement with the gullet of the next successive tooth, locking the arbor against movement in a clockwise direction and indexing the saw blade a prescribed angular increment. A wheel is provided at the end of the arbor shaft to facilitate manual turning of the tooth spacing patterns relative to the pawl means 49. Pawl means 49 may be moved along slide bar 51 so that the pawl point 62 may be operatively engaged with any one of the tooth spacing pattern 47. The patterns 47 vary in total numbers of teeth, so that one selected pattern will correspond directly or proportionately to the number of teeth on a saw blade to be sharpened.

The screw 56 provides an adjustment feature that allows a saw blade to be properly aligned with the vertical surface of grinding disc 13 regardless of how the saw blade is positioned on the arbor. In operation, the adjusting screw 56 is turned until the hook angle of a selected tooth is in alignment with an upright surface of the grinding disc 13.

The disc 13 and mounting means 25 are illustrated in substantial detail by FIGS. 1 and 4. Looking first with reference to FIG. 1, the mounting means 25 is shown as a parallelogram type linkage 64 that is mounted to the upright 33 at vertically spaced anchor pivot points 65. The remaining structure of disc mounting means 25 is best described with reference to FIG. 4. Parallelogram linkage 64 is comprised of a number of vertically oriented links 63 connected by parallel intermediate links 66 at equally spaced pivot points 68. Grinding disc 13 and motor 26 are mounted to a forwardly projecting platform 69 provided on one of the upright links 66. The disc is carried on an arbor shaft 70 that is journalled within bearings 71 on the platform. The drive motor is connected by a belt to one end of the disc arbor with the remaining end of the arbor receiving the grinding disc 13. The rotational axis of the grinding disc arbor is horizontal and is maintained in this horizontal relationship by the parallelogram linkage 64. This linkage provides that the disc may move relatively freely within a fixed plane and in a prescribed angular orientation within that plane. In other words, motion imparted to the linkage 64 results in corresponding curvilinear translation of the grinding disc. It is important that the disc faces be maintained in a prescribed angular orientation in order that the template 29 and trace pin 27 be functional to produce identical configurations along the teeth of a saw blade 12.

The trace pin 27, as shown in FIG. 4, is slidably mounted to one of the upright links 63. It is vertically adjustable on the upright link to enable a "depth of cut" adjustment of grinding disc 13. This adjustment feature enables a user to select a desired depth of cut for each or all of the passes made by disc 13 over the successive teeth of a saw blade held on arbor 17.

The adjustment feature is simply comprised of a threaded shaft 75 fixed to a bar that has the trace pin 27 mounted at one end thereof. The shaft is vertical and is threadably engaged with an adjusting knob 76 that is sandwiched between shaft guides 77 on the upright link 63. Rotation of knob 76 relative to the shaft results in vertical movement of the shaft along a guide way 78 provided by upright 63.

The template 29 is pivotably mounted to upright 33 by means of a nut 79. Loosening of the nut enables pivotal movement of the template about a fixed horizontal axis to bring any selected tooth configuration 30 into operation alignment with the trace pin 27. The different configurations 30 found on the template 29 represent a variety of common tooth shapes. It is conceivable that several such templates could be provided to enable efficient operation of the present sharpening apparatus with blades having many different tooth configurations. This adjustment feature, along with the selection provided by the several tooth spacing patterns 47 enables use of the present apparatus with a large variety of circular saw blades having differing tooth spacing and tooth configuration as well as blade diameters.

The trace pin 27 is normally biased away from engagement with the template 29 by a spring 80 and lever mechanism 81. The spring is best shown in FIG. 1. Spring 80 is connected between a fixed point 80a on upright 33 and a midpoint 80b on lever 81. Lever 81, in turn, is pivotably mounted at one end to a horizontal extension 81a of upright 33. The remaining end of lever 81 is connected to an upright link 81b that is pivotably connected at an upper end to the parallelogram linkage 64.

Spring tension serves to pull the lever 81 upwardly about its pivot axis to lift the parallelogram linkage 64 upwardly to disengage the pin 27 from template 29.

An operator may selectively engage the pin 27 within a selected tooth configuration on template 29 by operating a control handle 82. Handle 82 is shown in FIGS. 1 and 2 and partially in FIG. 4. Handle 82 is mounted by a universal ball type connection 82a to a bracket 83 (FIG. 2) provided on upright 33. The handle 82 is also connected midway along its length to another universal connection 82b on parallelogram linkage 64. A handle then extends outward from the joint 82b to hand grip 85 (FIG. 2).

An operator may use the handle to move the parallelogram linkage 64 (and therefore the grinding disc 13) in relatively any desired direction within a fixed vertical plane. Thus, he may trace the tooth pattern provided on template 29 by moving the trace pin 27 over a selected tooth configuration 30. The grinding disc 13 will move correspondingly to cut an identical tooth configuration in a blade properly positioned on arbor 17.

Another feature provided by the present apparatus is an alignment vise 86 and an adjustable tooth spacing stop 87 (FIGS. 1 & 2). The vise 86 and stop 87 are positioned adjacent each other and mounted to the arbor carriage 19 adjacent saw blade 12. Alignment vise 86 is designed to selectively grip the saw blade on opposite sides at a point close to the area in which the grinding disc 13 will be operating. This serves to hold the saw blade in vertical alignment and to prevent vibration of the saw blade during the sharpening operation. The adjustable stop 87 is provided as an auxiliary stop mechanism associated with the indexing means 22. As with alignment vise 86, the adjustable stop 87 functions to engage the saw blade 12 adjacent a point near where the grinding disc will be operating. The stop 87 prevents rotational movement of the saw blade in a clockwise direction to augment the spacing and stop features of the pawl means 49 at the laterally spaced location adjacent the tooth spacing patterns 47. Like pawl means 49, the stop 87 is provided with an adjusting screw 88. Screw 88 enables compensating adjustment of the position of stop 87 in response to initial adjustment of the pawl means 49 to bring a selected saw tooth into proper alignment with grinding disc 13.

In describing the operation of the present invention, a specific example of a saw blade having a specified number of teeth and a particular tooth configuration will be given. For this example, we will assume that the saw blade has 120 identical equally spaced teeth and a diameter of 12 inches. These characteristics are determined by the operator before he performs any of the sharpening steps. Once the blade diameter and number of teeth are determined, the operator may slide the pawl means 49 to a selected tooth spacing pattern having the identical number of teeth spaced thereon.

The number of teeth in commercial saw blades often occur in whole number multiples. Thus, a table may be provided on indicator surface 52a adjacent the position indicator 52 for pawl means 49. This table would list a variety of tooth spacing patterns and a number of saw blades (with varying numbers of teeth) that each pattern will accommodate. If none of the patterns will exactly accommodate the number of teeth on a particular blade, a pattern may be selected that includes a multiple of the number of teeth on the blade. Then, by skipping a uniform number of spaces on the selected pattern, the proper tooth spacing may be obtained. However, if there is provided a spacing pattern having exactly 120 spaces about its periphery, the pawl means 49 is moved to that pattern and the pawl point 62 is engaged with the selected pattern teeth 48.

The next step in operation is to select the proper tooth shape on template 29 that corresponds with the shape of the teeth on the saw blade. In doing so, the operator loosens the nut 79 and pivots the template until the proper tooth configuration 30 is aligned for operational engagement with the trace pin 27. The selected tooth configuration 30 is positioned with one surface, representing a tooth face, oriented vertically. This may be accomplished by providing a reference line or some form of stop on the frame 33 to facilitate such alignment. This surface will designate the path of travel for grinding disc 13 that will result in formation of the face of each tooth to be sharpened. Once in proper position, the bolt or nut 79 is tightened to secure the template 29 in place.

The next step for the operator is to properly position the angular disposition arbor carriage 19 by adjusting the stop means 20. This is accomplished by loosening the locking screw 44 and sliding the guide 41 to a selected location (as may be determined by the indentations on bar 42). In the selected position, the ends of cross member 43 will stop pivotal movement of carriage 19 at equal and opposite predetermined angles on opposite sides of the saw blade. These angles determine the bevel angles to be ground on the saw teeth.

After accomplishing the above steps, the operator may then place the saw blade on arbor 17. Once the blade is in place on the arbor and locked in position, the blade size adjusting bar 38 may be moved to accommodate for the blade diameter. When the lift frame 39 is in proper position, the adjusting bar 38 may be locked to the upright 37, thereby securing the arbor in a fixed horizontal plane relative to the operational limits of movement for parallelogram linkage 64.

The adjusting bolt 35 on the arbor carriage may be positioned to locate the blade laterally so a selected tooth face is substantially aligned with an inside surface of the grinding disc 13. This adjustment is accomplished with a greater degree of accuracy by pawl means 49. By turning the adjusting screw 56, corresponding rotation of the saw blade will occur to precisely align the selected saw tooth face in a vertical plane parallel with the vertical inside surface of grinding disc 13.

Once the proper position of the saw blade has been established and proper alignment of a selected tooth has been accomplished, the alignment vise 86 is operated to clamp the blade adjacent the selected tooth and the adjustable stop 87 is moved into engagement between teeth adjacent the selected tooth to be sharpened.

At this point, the grinding disc 13 may be dressed to bring the disc surface into a desired configuration and texture. This step may be performed by a separate grinding disc dressing apparatus or may be accomplished on the present machine through provision of a dressing tool which, for the purpose of brevity, will not be discussed in this description.

After the disc is properly dressed, the depth of cut may be adjusted by holding the trace pin 27 in the bottom or gullet of the selected tooth pattern and turning adjusting knob 76 until the disc moves into engagement with the gullet or gum of the saw blade to be sharpened. This may be done with the motor 26 operating so a deeper gullet may be ground by the disc.

These steps bring the apparatus into condition for starting the sharpening process. After actuating the drive motor 26, the operator begins by moving the handle 82 so trace pin 27 will move along the template surfaces defining the proper selected tooth configuration. Corresponding movement of the grinding disc will occur over the surface of the saw blade and material will be removed therefrom that does not exactly conform to the configuration of the selected tooth on template 29. Once the operator has completed the step of grinding one tooth configuration, he may release the handle 82, allowing spring 80 to return the grinding disc to a position above and away from engagement with the saw blade. He then turns the pattern indexing wheel to slide the selected tooth spacing pattern 47 over pawl means 49 until the gullet of the next successive spacing tooth 48 is engaged by the pawl point 62. This movement also causes corresponding movement of the saw blade to bring the next successive tooth into proper alignment with the grinding disc. The operator then again grasps the hand grip 85 and moves the grinding disc according to the template configuration by moving trace pin 27 over the selected tooth shape 30. These steps are repeated for each tooth on the saw blade.

Bevel angles are determined as discussed above by selecting the proper carriage stop position. Equal and opposite bevel angles are often required on alternate teeth of the same saw blade. The user will pivot the arbor carriage from one angular position to another as the alternating teeth are ground.

It may be understood that, in operating the indexing means 22 in combination with the provisions of the template 29, it is possible not only to sharpen a circular saw blade but also to eliminate such imperfections as blade eccentricity, variable tooth spacing, and variable tooth shape and size.

A saw blade ground by the present apparatus by a competent operator will be perfectly true, thus facilitating the best possible performance in cutting operations.

It may have become obvious from reading the above description along with examination of the accompanying drawings, that various changes and modifications may be made therein. It is well understood that minor changes and modifications may be made to the present apparatus without departing from the intended scope of my invention. Therefore, only the following claims are to be taken as definitions and as restrictions on the scope of my invention.

What I claim is:

1. A circular saw blade sharpening apparatus, comprising:
   an upright supportive framework;
   a circular saw blade receiving arbor on the framework;
   a circular grinding disc;
   drive means for rotating the grinding disc about its center axis;
   disc mounting means for holding the disc in a prescribed angular orientation and for mounting the disc to the supportive framework for movement in the prescribed angular orientation so the disc may operatively engage a saw blade mounted on the arbor;
   a sawtooth-shaped template on the supportive framework having a sawtooth configuration thereon similar to the configuration of a tooth on a saw blade to be sharpened;
   a trace pin on the disc mounting means operatively engageable with the template so that movement of the trace pin over the template causes corresponding tracing movement of the grinding disc;
   saw blade indexing means operatively associated with the arbor for enabling selective incremental rotation of a saw blade mounted on the arbor about an arbor axis in prescribed angular increments equal to correct spacing between adjacent teeth on the saw blade regardless of existing spacing of saw teeth about the blade periphery, and wherein the arbor is pivotable relative to the grinding disc about a pivot axis such that a saw blade on the arbor may be set with its planar side surfaces at a selected angle relative to the rotational axis of the disc.

2. The apparatus as defined by claim 1 wherein the apparatus further comprises stop means for selectively limiting pivotal movement of the arbor about the pivot axis.

3. The apparatus as defined by claim 2 wherein the stop means is operative to stop pivotal movement of the arbor about the pivot axis at points on opposite sides of the disc center axis so that angles formed between the disc center axis and stop points are equal.

4. The apparatus as defined by claim 1 further comprising biasing means connecting the disc mounting means and supportive framework for urging the grinding disc to a normal position away from engagement with a saw blade when mounted on the arbor.

5. The apparatus as defined by claim 1 further comprising adjusting means between the trace pin and disc mounting means for selectively determining the amount of vertical movement of the grinding disc relative to a saw blade mounted on the arbor in response to corresponding vertical movement of the trace pin along the saw tooth-shaped template.

6. The apparatus as defined by claim 1 wherein the saw blade indexing means includes:
   a circular saw blade tooth spacing pattern fixed to the arbor; and
   pawl means operatively associated with the circular pattern for allowing angular movement of the arbor about its axis in precisely equal angular increments.

7. The apparatus as defined by claim 6 wherein the indexing means includes a plurality of the circular saw blade tooth spacing patterns fixed to the arbor and wherein the pawl means is selectively movable to operatively engage any one of the patterns.

8. The apparatus as defined by claim 1 further comprising tooth alignment means for selectively adjusting the angular position of a selected sawtooth of a blade on the arbor relative to the disc.

9. The apparatus as defined by claim 1 wherein the sawtoothshaped template includes a plurality of sawtooth configurations thereon spaced in an arc about a center pivot and wherein the template is pivotably mounted to the framework by the pivot so any one selected sawtooth configuration may be pivoted into operative alignment with the trace pin.

10. The apparatus as defined by claim 9 wherein the arbor is pivotable relative to the grinding disc about a pivot axis that is spaced apart from and angularly offset from the arbor axis and wherein the apparatus further comprises stop means for selectively limiting pivotal movement of the arbor about the pivot axis.

11. The apparatus as defined by claim 10 wherein the stop means is operative to stop pivotal movement of the arbor about the pivot axis at points on opposite sides on the disc center axis so the angles formed between the disc center axis and stop points are equal.

12. The apparatus as defined by claim 9 further comprising adjusting means between the trace pin and disc mounting means for selectively determining the amount of possible vertical movement of the grinding disc relative to a saw blade mounted on the arbor in response to corresponding vertical movement of the trace pin along the sawtooth shaped template.

13. The apparatus as defined by claim 9 wherein the saw blade indexing means includes:
   a circular saw blade tooth spacing pattern fixed to the arbor; and
   pawl means operatively associated with the circular tooth spacing pattern for allowing rotational movement of the arbor about its axis in precisely equal angular increments irrespective of the spacing of teeth on a saw blade mounted to the arbor.

14. The apparatus as defined by claim 13 wherein the indexing means includes a plurality of the circular saw blade tooth spacing patterns fixed to the arbor and wherein the pawl means is selectively movable to operatively engage any one of the patterns.

15. The apparatus as defined by claim 13 further comprising tooth alignment means for selectively adjusting the angular position of a selected sawtooth of a blade on the arbor relative to the disc.

16. The apparatus as defined by claim 11 wherein the stop means includes adjusting means to stop pivotal movement of the arbor about the pivot axis at any of a plurality of preselected positions.

17. The apparatus as defined by claim 1 further comprising a releasable blade alignment vise means on the framework for selectively gripping a portion of a saw blade, when mounted to the arbor, at a location thereon closely adjacent a sawtooth selected to be operated on by the grinding disc.

18. The apparatus as defined by claim 1 wherein the arbor is movably adjustable relative to the grinding disc to accommodate differing size saw blades.

19. The apparatus as defined by claim 1 wherein the disc mounting means is comprised of a parallelogram linkage means interconnecting the disc and framework for imparting curvilinear translation to the disc in response to movement of the trace pin over the tooth template.

20. The apparatus as defined by claim 19 further comprising adjusting means between the trace pin and disc mounting means for selectively determining the amount of vertical movement of the grinding disc relative to a saw blade mounted on the arbor in response to corresponding vertical movement of the trace pin along the sawtooth shaped template.

21. The apparatus as defined by claim 20 wherein the adjusting means is comprised of:
a threaded shaft slidably mounted to the linkage and having the trace pin mounted to one end thereof;
an adjusting nut threadably engaging the shaft;
abutment surfaces on the linkage closely adjacent opposite sides of the adjusting nut to prevent movement of the nut along the shaft relative to the linkage.

* * * * *